US008309645B2

(12) United States Patent
Swei et al.

(10) Patent No.: US 8,309,645 B2

(45) Date of Patent: Nov. 13, 2012

(54) THERMALLY STABLE COMPOSITE MATERIAL FORMED OF POLYIMIDE

(75) Inventors: Gwo S. Swei, Vandalia, OH (US); Ilya L. Rushkin, Acton, MA (US); Pawel Czubarow, Wellesley, MA (US); David Worth House, Arlington Heights, IL (US); David DeCoster, Barrington, RI (US); Olivier Guiselin, Northboro, MA (US)

(73) Assignee: Saint-Gobain Performance Plastics Corporation, Aurora, OH (US)

( * ) Notice: Subject to any disclaimer, the term of this patent is extended or adjusted under 35 U.S.C. 154(b) by 161 days.

(21) Appl. No.: 11/867,520

(22) Filed: Oct. 4, 2007
(Under 37 CFR 1.47)

(65) Prior Publication Data

US 2009/0093581 A1 Apr. 9, 2009

(51) Int. Cl.
*C08K 3/04* (2006.01)

(52) U.S. Cl. ........ 524/496; 524/405; 524/409; 524/414; 524/495

(58) Field of Classification Search .................. 524/430, 524/496, 405, 409, 414, 495
See application file for complete search history.

(56) References Cited

U.S. PATENT DOCUMENTS

| | | | | |
|---|---|---|---|---|
| 3,249,588 | A * | 5/1966 | Gall | 528/21 |
| 3,287,311 | A | 11/1966 | Edwards | |
| 3,804,669 | A * | 4/1974 | Bockstie, Jr. | 428/432 |
| 4,360,626 | A * | 11/1982 | Manwiller | 524/495 |
| 4,622,384 | A * | 11/1986 | Manwiller | 528/353 |
| 4,755,428 | A * | 7/1988 | Noda et al. | 428/402 |
| 5,356,374 | A * | 10/1994 | Hogan et al. | 604/5.01 |
| 5,886,129 | A | 3/1999 | DeColibus | |
| 6,886,233 | B2 | 5/2005 | Rutherford et al. | |
| 6,927,250 | B2 | 8/2005 | Kaschak et al. | |
| 7,105,108 | B2 | 9/2006 | Kaschak et al. | |
| 7,108,841 | B2 | 9/2006 | Smalley et al. | |
| 2003/0211314 | A1 | 11/2003 | Rutherford et al. | |
| 2004/0034151 | A1* | 2/2004 | Kaschak et al. | 524/495 |
| 2004/0127621 | A1* | 7/2004 | Drzal et al. | 524/424 |
| 2005/0221023 | A1* | 10/2005 | Sakamoto et al. | 428/1.3 |
| 2006/0231792 | A1 | 10/2006 | Drzal et al. | |
| 2007/0092432 | A1 | 4/2007 | Prud'Homme et al. | |
| 2007/0154717 | A1* | 7/2007 | Beltz et al. | 428/411.1 |

FOREIGN PATENT DOCUMENTS

| | | | |
|---|---|---|---|
| EP | 1742524 | A1 | 1/2007 |
| EP | 1755186 | A1 | 2/2007 |
| WO | 03024602 | A1 | 3/2003 |
| WO | 2006083796 | A2 | 8/2006 |
| WO | 2006110627 | A1 | 10/2006 |
| WO | 2006115729 | A1 | 11/2006 |

* cited by examiner

*Primary Examiner* — Peter Szekely

(74) *Attorney, Agent, or Firm* — Abel Law Group, LLP; Chi Suk Kim

(57) ABSTRACT

A composite material includes a polyimide matrix material and an exfoliated graphite material dispersed within the polyimide matrix material. The composite material exhibits a Thermal Stability Index of at least about 20 and has a particle distribution in which 90% of the particles have a particle size not greater than 500 micrometers.

26 Claims, No Drawings

THERMALLY STABLE COMPOSITE MATERIAL FORMED OF POLYIMIDE

FIELD OF THE DISCLOSURE

This disclosure, in general, relates to composite materials formed of polyimide that exhibit improved thermal oxidative stability.

BACKGROUND

In industries, such as aerospace, automobile manufacturing, and semiconductor manufacturing, intricate components and tools are increasingly being used in high temperature environments. Traditionally, manufacturers have used metal and ceramic materials to form such components and tools based on the tolerance of such materials for high temperatures.

More recently, industry is seeking to use polymeric materials as alternatives to metal and ceramic materials. In general, polymeric materials are less expensive and lighter in weight than both metal and ceramic materials. Typically, polymeric materials are significantly lighter than metal. In addition, polymers often cost less than one-tenth the cost of ceramic materials, can be molded at lower temperatures than ceramic materials, and are easier to machine than ceramic materials.

However, unlike metal and ceramic materials, polymeric materials tend to degrade at high temperatures. Typically, at elevated temperatures, polymeric materials lose mechanical strength as well. In addition, when exposed to elevated temperatures in an atmosphere including oxygen, polymeric materials tend to lose mass through oxidation and off gassing. Such a loss of mass often results in changes in the dimensions of an article formed of such polymeric materials. In addition, such a loss in mass typically results in reduced mechanical strength, such as a decrease in tensile strength and elongation properties.

As such, improved polymeric materials would be desirable.

SUMMARY

In a particular embodiment, a composite material includes a polyimide matrix material and an exfoliated graphite material disbursed within the polyimide matrix material. The composite material exhibits a Thermal Stability Index of at least about 20 and has a particle distribution in which 90% of the particles have a particle size not greater than 500 micrometers.

In another exemplary embodiment, a composite material includes a moldable polyimide matrix material, and an exfoliated graphite material dispersed within the moldable polyimide matrix material. The composite material has a particle distribution in which 90% of the particles have a particle size not greater than 500 micrometers.

In an additional exemplary embodiment, a method of forming a composite powder includes providing exfoliated graphite powder and polyamic acid in a solution including at least two solvents, and imidizing the polyamic acid to form a polyimide material matrix including the exfoliated graphite material dispersed therein.

In a further exemplary embodiment, a method of forming a composite material includes dispersing an exfoliated graphite material in a solution comprising a diamine, adding a dianhydride to the solution comprising the diamine and the exfoliated graphite material resulting in a polyamide intermediate material, and dehydrating the polyamide intermediate material to form a polyimide material matrix including the exfoliated graphite material disbursed therein.

DESCRIPTION OF THE EMBODIMENTS

In a particular embodiment, a composite material includes a polyimide matrix material and an exfoliated graphite material disbursed therein. In particular, the composite material may be a molding powder, such as a direct formable molding powder. The exfoliated graphite material may be a treated exfoliated graphite material or an untreated exfoliated graphite material. In addition, the composite material may include a metal oxide material, such as an oxide of antimony, boron, phosphorous, silicon, or any combination thereof. In a particular example, the composite material exhibits a desirable thermal oxidative stability. For example, the thermal oxidative stability may be expressed in terms of a Thermal Stability Index, defined below, of at least about 20.

In another exemplary embodiment, a method of forming a composite material includes dispersing an exfoliated graphite material in a solution including at least one diamine. A dianhydride may be added to the solution including at least one diamine and the exfoliated graphite material. As a result, a polyamic acid intermediate material may be formed within which the exfoliated graphite material is disbursed. The polyamic acid intermediate material may be dehydrated to form a polyimide matrix material in which the exfoliated graphite material is disbursed.

In particular, the polyimide may be formed from a polyamic acid intermediate material formed through the reaction of a dianhydride with a diamine. A polyamic acid may be imidized, such as through dehydration, to form a polyimide material.

In an exemplary embodiment, the polyamic acid intermediate material is formed from a dianhydride, and, in particular, aromatic dianhydride. An exemplary dianhydride includes pyromellitic dianhydride (PMDA), 2,3,6,7-naphthalenetetracarboxylic acid dianhydride, 3,3',4,4'-diphenyltetracarboxylic acid dianhydride, 1,2,5,6-naphthalenetetracarboxylic acid dianhydride, 2,2',3,3'-diphenyltetracarboxylic acid dianhydride, 2,2-bis-(3,4-dicarboxyphenyl)-propane dianhydride, bis-(3,4-dicarboxyphenyl)-sulfone dianhydride, bis-(3,4-dicarboxyphenyl)-ether dianhydride, 2,2-bis-(2,3-dicarboxyphenyl)-propane dianhydride, 1,1-bis-(2,3-dicarboxyphenyl)-ethane dianhydride, 1,1-bis-(3,4-dicarboxyphenyl)-ethane dianhydride, bis-(2,3-dicarboxyphenyl)-methane dianhydride, bis-(3,4-dicarboxyphenyl)-methane dianhydride, 3,4,3',4'-benzophenonetetracarboxylic acid dianhydride, or any mixture thereof. In a particular example, the dianhydride is pyromellitic dianhydride (PMDA). In another example, the dianhydride is benzophenonetetracarboxylic acid dianhydride (BTDA) or diphenyltetracarboxylic acid dianhydride (BPDA).

In another exemplary embodiment, the polyamic acid intermediate material is formed from a diamine. An exemplary diamine includes oxydianiline (ODA), 4,4'-diaminodiphenylpropane, 4,4'-diaminodiphenylmethane, 4,4'-diaminodiphenylamine, benzidine, 4,4'-diaminodiphenyl sulfide, 4,4'-diaminodiphenyl sulfone, 3,3'-diaminodiphenyl sulfone, 4,4'-diaminodiphenyl ether, bis-(4-aminophenyl)diethylsilane, bis-(4-aminophenyl)-phenylphosphine oxide, bis-(4-aminophenyl)-N-methylamine, 1,5-diaminonaphthalene, 3,3'-dimethyl-4,4'-diaminobiphenyl, 3,3'-dimethoxybenzidine, 1,4-bis-(p-aminophenoxy)-benzene, 1,3-bis-(p-aminophenoxy)-benzene, m-phenylenediamine (MPD), p-phenylenediamine (PPD), or any mixture thereof. In a particular example, the diamine is oxydianiline (ODA), such as 3,4'-oxydianiline or 4,4'-oxydianiline. In particular, the ODA may be 4,4'-oxydianiline. In another example, the diamine is m-phenylenediamine (MPD), p-phenylenediamine (PPD), or any combination thereof.

In a particular embodiment, the polyamic acid intermediate materials may be formed through the reaction of a diamine with one or more species of dianhydride. In another exemplary embodiment, the polyamic acid intermediate material may be formed by the mixture of a dianhydride with one or more species of diamine.

For example, a dianhydride, such as pyromellitic dianhydride (PMDA) or diphenyltetracarboxylic acid dianhydride (BPDA), may be reacted with two or more diamines selected from oxydianiline (ODA), m-phenylenediamine (MPD), or p-phenylenediamine (PPD). In particular, a polyimide material may be formed from the reaction of BPDA with a mixture of PPD and MPD. For example, the PPD and MPD may be incorporated in a mole ratio of about 0.6:1 to about 1.5:1 PPD:MPD. In another example, PPD and MPD may be incorporated in a mole ratio of about 4:1 to about 20:1 PPD/MPD. In another embodiment, a polyimide material may be formed from the reaction of BPDA with a mixture of PPD and ODA, such as 4,4'-ODA. For example, the PPD and ODA may be incorporated in a ratio of about 1:1 to about 20:1 PPD:ODA.

In an exemplary embodiment, an exfoliated graphite material may be disbursed within the polyimide matrix of a composite material. In particular, the exfoliated graphite material may have a mean sheet thickness of not greater than about 0.5 micrometers. Further, a ratio of the graphite sheet mean diameter to the graphite sheet mean thickness may be at least about 10. The exfoliated graphite material may be untreated or may be treated. In an exemplary embodiment, treated exfoliated graphite material may include exfoliated graphite material that is partially oxidized. For example, a treated exfoliated graphite material may be formed from rapid thermal treatment of oxidized graphite material. An exemplary treated exfoliated graphite material may have surface functional groups, such as epoxy groups. In particular, the treated exfoliated graphite material may have a carbon to oxygen ratio in a range of about 5:1 to about 20:1, such as a range of about 8:1 to about 15:1, or about 9:1 to about 12:1. In a further exemplary embodiment, the exfoliated graphite material may be a graphene material. The graphene material may be treated or untreated.

Further, the exfoliated graphite material may have a surface area in a range of about 500 $m^2/g$ to about 2000 $m^2/g$. For example, the exfoliated graphite material may have a surface area in a range of about 600 $m^2/g$ to about 1750 $m^2/g$, such as a range of about 700 $m^2/g$ to about 1500 $m^2/g$.

The exfoliated graphite material may be included in the composite material in an amount in a range of about 5 wt % to about 75 wt %. For example, the range may be about 5 wt % to about 60 wt %, such as about 10 wt % to about 45 wt %, or even greater than 20 wt % and not greater than 45 wt %. Alternatively, the exfoliated graphite material may be included in the composite material in an amount not greater than about 5 wt %.

The composite material including a polyimide matrix and the exfoliated graphite material may further include an additive, such as a metal oxide particulate dispersed in the polyimide matrix. The metal oxide particulate may include an oxide of a metal or a semi-metal selected from groups 1 through 16 of the periodic table. In particular, the metal oxide component may be an oxide of a metal or a semi-metal selected from groups 1 through 13, group 14 at or below period 3, group 15 at or below period 3, or group 16 at or below period 5 of the periodic table. For example, the metal oxide may include an oxide of a metal or semi-metal selected from the group consisting of aluminum, antimony, barium, bismuth, boron, calcium, chromium, cobalt, copper, gallium, hafnium, iron, magnesium, manganese, molybdenum, nickel, niobium, phosphorous, silicon, tantalum, tellurium, tin, titanium, tungsten, vanadium, yttrium, zirconium, and zinc. In a particular embodiment, the metal oxide may include a metal oxide of aluminum, antimony, boron, gallium, hafnium, manganese, molybdenum, phosphorous, tantalum, tellurium, tin, tungsten, yttrium, or any combination thereof. In a particular example, the metal oxide includes boronsilicate. In another embodiment, the metal oxide includes an oxide of gallium. In a further embodiment, the metal oxide includes an oxide of antimony. In an additional embodiment, the metal oxide includes an oxide of boron. Also, the metal oxide may include an oxide of tungsten. In addition, the metal oxide may include an oxide of phosphorous. Herein, the term metal oxide is generally used to refer to oxides of metals and semi-metals.

In general, the metal oxide is in the form of particulate material. In an example, the particulate material has an average particle size not greater than about 100 microns, such as not greater than about 45 microns, or not greater than about 5 microns. For example, the particulate material may have an average particle size not greater than about 1000 nm, such as not greater than about 500 nm, or not greater than about 150 nm. Further, the average particle size may be at least about 10 nm, such as at least about 50 nm.

In a particular embodiment, the particulate material has a low aspect ratio. The aspect ratio is an average ratio of the longest dimension of a particle to the third longest dimension perpendicular to the longest dimension. For example, the particulate material may have an average aspect ratio not greater than about 2.0, such as about 1.0 or generally spherical.

In an exemplary embodiment, the composite material includes about 0.1 wt % to about 50.0 wt % metal oxide particulate. For example, the composite material may include about 0.1 wt % to about 20.0 wt % of the metal oxide particulate, such as about 0.1 wt % to about 10.0 wt %, or about 0.1 wt % to about 5.0 wt % of the metal oxide particulate. In a particular example, the composite material may include less than about 5.0 wt %, such as about 0.1 wt % to about 2.5 wt % of the metal oxide particulate, such as about 0.5 wt % to about 2.5 wt %, or about 0.5 wt % to about 1.5 wt % of the metal oxide particulate.

In addition, the composite material may include other fillers. For example, the composite material may include fillers formed of another polymer, another ceramic, a metal, or any combination thereof.

In an exemplary embodiment, the composite material includes an exfoliated graphite material disbursed within a polyimide matrix. An exfoliated graphite material may be added prior to the reaction of precursors to form the polyamic acid intermediate material, after the formation of the polyamic acid intermediate material, or after the imidization of the polyamic acid intermediate material to form a polyimide matrix. In a particular example, an exfoliated graphite material is added to one or both of the precursors prior to the formation of the polyamic acid intermediate material. For example, the exfoliated graphite material may be added to a solution including a diamine. In another example, the exfoliated graphite material may be added to a solution including a dianhydride.

In particular, one of two methods may be employed for synthesis of polyimide material. The first method includes reaction of dianhydrides with diamines in the presence of a mixture of solvents to form a high molecular weight polyamic acid, followed by imidization at elevated temperatures. In a second method, polyimide powder is prepared from a concentrated solution of dianhydride diesters with diamine components in a suitable solvent. The concentrated solution is heated to effect polycondensation and imidization reactions.

In a particular embodiment, the first method includes employing a mixed solvent system. For example, the solvent system employed may include at least two solvents: a high polarity solvent and a low polarity solvent. In an example, the high polarity solvent may be a high polarity, high solubility constant solvent in which polyamic acid is soluble. For example, the high polarity solvent may include N-methylpyrrolidone (NMP), N,N'-dimethylformamide (DMF), N,N'-dimethylacetamide (DMAC), or any combination thereof. In a particular example, the high polarity solvent includes N-methylpyrrolidone (NMP).

In a further example, the low polarity solvent may be a low polarity, low solubility constant solvent and may be a poor solvent for polyamic acid. In a particular example, the low polarity solvent may form an azeotrope with water. In an example, the low polarity solvent may include toluene, xylene, ethyl acetate, t-butyl methyl ether, or any combination thereof. In a particular example, the low polarity solvent includes xylene.

Based on the total weight of the solvents used in the reaction mixture, the amount of high polarity solvent used in the reaction mixture may be in a range from about 40% to about 90% by weight. For example, the high polarity solvent may be used in an amount of about 40% to about 70%, such as about 50% to about 65% by weight. The amount of low polarity solvent may be about 10% to about 60% based on the total weight of the solvents used in the reaction mixture, such as about 30% to about 60% or even about 35% to about 50% by weight. In another example, the high polarity solvent and the low polarity solvent may form a mixture having a ratio of about 1:9 to about 9:1 high polarity solvent to low polarity solvent by weight, such as about 1:3 to about 6:1 by weight. For example, the ratio may be about 1:1 to about 6:1 by weight, such as about 3.5:1 to about 4:1 high polarity solvent to low polarity solvent by weight.

In an exemplary embodiment, diamine components are dissolved in the solvents. In an example, the diamine components may be added to the solvents at the same time or separately and dissolved within the solvents. An exemplary diamine includes oxydianiline (ODA), 4,4'-diaminodiphenylpropane, 4,4'-diaminodiphenylmethane, 4,4'-diaminodiphenylamine, benzidine, 4,4'-diaminodiphenyl sulfide, 4,4'-diaminodiphenyl sulfone, 3,3'-diaminodiphenyl sulfone, 4,4'-diaminodiphenyl ether, bis-(4-aminophenyl)diethylsilane, bis-(4-aminophenyl)-phenylphosphine oxide, bis-(4-aminophenyl)-N-methylamine, 1,5-diaminonaphthalene, 3,3'-dimethyl-4,4'-diaminobiphenyl, 3,3'-dimethoxybenzidine, 1,4-bis-(p-aminophenoxy)-benzene, 1,3-bis(p-aminophenoxy)-benzene, m-phenylenediamine (MPD) or p-phenylenediamine (PPD), or any mixture thereof. The ODA may be 3,4'-oxydianiline or 4,4'-oxydianiline. In particular, the ODA may be 4,4'-oxydianiline. In a particular example, one of the diamines is oxydianiline (ODA). In another example, the diamines include m-phenylenediamine (MPD), p-phenylenediamine (PPD), or a mixture thereof.

The solution including the solvents and the diamines may be heated to an elevated temperature. In particular, the solution may be heated to an elevated temperature at which the low polarity solvent forms an azeotrope with water. For example, the solution may be heated to a temperature of at least about 70° C., such as at least about 100° C., or even at least about 150° C. Once the water is removed, the solution may be cooled.

A dianhydride component may be added to bring about a polycondensation reaction. An exemplary dianhydride includes pyromellitic dianhydride (PMDA), 2,3,6,7-naphthalenetetracarboxylic acid dianhydride, 3,3',4,4'-diphenyltetracarboxylic acid dianhydride, 1,2,5,6-naphthalenetetracarboxylic acid dianhydride, 2,2',3,3'-diphenyltetracarboxylic acid dianhydride, 2,2-bis-(3,4-dicarboxyphenyl)-propane dianhydride, bis-(3,4-dicarboxyphenyl)-sulfone dianhydride, bis-(3,4-dicarboxyphenyl)ether dianhydride, 2,2-bis-(2,3-dicarboxyphenyl)-propane dianhydride, 1,1-bis-(2,3-dicarboxyphenyl)-ethane dianhydride, 1,1-bis-(3,4-dicarboxyphenyl)-ethane dianhydride, bis-(2,3-dicarboxyphenyl)-methane dianhydride, bis-(3,4-dicarboxyphenyl)-methane dianhydride, 3,4,3',4'-benzophenonetetracarboxylic acid dianhydride, or any mixture thereof. In a particular example, the dianhydride is pyromellitic dianhydride (PMDA). In another example, the dianhydride is benzophenonetetracarboxylic acid dianhydride (BTDA) or diphenyltetracarboxylic acid dianhydride (BPDA). In an example, the ratio of the dianhydride component to the total amount of the diamine components may be between 0.95 and 1.05 based on molar stoichiometry.

The reaction temperature may range from about 20° C. to about 100° C. In particular, the reaction may be allowed to progress to achieve a desired molecular weight of polyamic acid. The molecular weight of the polyamic acid may be inferred from the Inherent Viscosity (IV) of the solution, as described in U.S. Pat. No. 5,886,129. The IV values are typically between 0.2 dl/g and 3.0 dl/g. For example, the IV values may be about 0.6 dl/g to about 2.0 dl/g, such as about 0.7 dl/g to about 1.7 dl/g. As a result, a polyamic acid solution is formed.

Exfoliated graphite material may be added to the solution including diamine and solvent, may be added to with the dianhydride, or may be added to the formed polyamic acid intermediate material. In particular, the exfoliated graphite material may be added to the diamine solution prior or after azeotrope treatment. Alternatively, the exfoliated graphite material may be added together with dianhydride component or after polyamic acid is formed. Further, a metal oxide component may be added, generally in the solution including the diamine or in conjunction with addition of the dianhydride. As a result, a slurry of polyamic acid with exfoliated graphite is formed.

In an example, a slurry of the polyamic acid solution with exfoliated graphite and optionally, metal oxide may be heated to facilitate imidization. In an example, the temperature is between 120° C. and 190° C. Water formed during the imidization is removed as an azeotrope with the low polarity solvent. As a result, a composite powder is formed.

In another example, a Lewis base, such as a tertiary amine, may be added to the exfoliated graphite/polyamic acid solution slurry, and the slurry may be heated to form a composite powder. In another exemplary embodiment, composite powder may be precipitated from the exfoliated graphite/polyamic acid solution slurry, for example, through addition of a dehydrating agent. Exemplary dehydrating agents include fatty acid anhydrides formed from acetic acid, propionic acid, butyric acid, or valeric acid, aromatic anhydride formed from benzoic acid or napthoic acid, anhydrides of carbonic acid or formic acid, aliphatic ketenes, or mixtures thereof.

As a result, a composite powder is formed. In an example, the composite powder may be collected by filtration and optionally washed. For example, the powder may be washed with a washing solvent. An exemplary washing solvent includes methanol, isopropanol, acetone, or any combination thereof.

Further, the powder may be dried. For example, the polyimide powder may be dried under vacuum. In another example, the powder is dried in a non-reactive atmosphere, such as in the presence of a non-reactive gas. An exemplary non-reactive gas includes nitrogen or a noble gas, such as helium, argon or neon, or any combination thereof, or any combination thereof. In addition, the polyimide powder may be dried at a temperature of about 180° C. to about 350° C.

In a particular example, the composite molding powder produced by the above method has a high surface area, >10 $m^2$/g, and can be formed into shapes by direct forming techniques. Further, the composite molding powder may be formed into shapes by hot compression molding or isostatic techniques. In particular, select molding powders formed through the above method and using particular species of dianhydride and diamines may result in a direct formable molding powder having a desirable thermal stability and mechanical properties. Moldable powders are polyimide powders that may be formed into articles through compression and sintering, the sintering being either concurrent with compression (e.g., hot compression moldable polyimide powders) or following compression. Direct formable powders are moldable powders that may be compressed into a green article and subsequently sintered.

In a second method, a composite powder is prepared from a slurry of concentrated solution of dianhydride diester and diamine components in a suitable solvent with the dispersed exfoliated graphite and optional metal oxide. For example, a dianhydride diester solution may be formed by reacting a dianhydride with an alcohol. In particular, dianhydride diesters may be derived from the above-identified dianhydrides in the presence of an alcohol, such as methanol, ethanol, propanol, or any combination thereof. To form a concentrated solution, a diamine components may be added to the dianhydride diester solution. For example, the diamine components may be selected from the group of diamine components identified above. Exfoliated graphite material may be added at any point to the mixture. In particular, the exfoliated graphite material is added with the diamine or the dianhydride ester.

The concentrated solution may be heated to a temperature in a range of about 120° C. to about 350° C. In an example, the concentrated solution is heated under vacuum. In another exemplary embodiment, the concentrated solution may be heated in an inert atmosphere, such as a non-reactive gas including a noble gas, nitrogen, or any combination thereof. The composite powder may be milled to obtain a desired particle size. In an example, a composite powder formed through such a method may be shaped using a method such as hot compressing molding.

The above methods in combination with a specific polyimide formulation provide composite materials having the desirable properties, including thermal stability and mechanical strength. In particular, the first method in combination with particular polyimide formulations provides direct formable composite materials having strength and thermal stability.

In a particular example, the resulting polyimide material is a powder, such as a molding powder. The molding powder may be direct formable, as described below. The powder may have a particle size distribution in which 90% of the particles have a particle size not greater than about 650 micrometers, such as not greater than about 500 micrometers, not greater than about 250 micrometers, or even not greater than about 100 micrometers.

To form an article, the composite material may be processed using various methods, such as direct forming, hot compression molding, isostatic molding, or any variation thereof. In another example, the composite material may be pressed and subsequently sintered to form the component, referred to herein as direct forming.

In a particular embodiment, the composite material advantageously exhibits an improved thermal stability. In particular, the composite material exhibits desirable thermal oxidative stability. The composite material is exposed to air at a pressure of 60 psi and a temperature of 370° C. for 100 hours. The percent of weight lost is the TOS Weight Loss. Embodiments of the composite material may exhibit a TOS Weight Loss of not greater than 5.0%. For example, particular embodiments of the composite material may exhibit a TOS Weight Loss not greater than about 3.5%, such as not greater than about 2.0%, or even not greater than about 1.5%.

As a result, the composite material may exhibit a desirable Thermal Stability Index defined as 100 times the change in the TOS Weight Loss divided by the TOS Weight Loss of the polyimide matrix material absent the exfoliated graphite material. The change in TOS Weight Loss is the difference between the TOS Weight Loss of a polyimide matrix including an exfoliated graphite material and a TOS Weight Loss of a polyimide matrix absent the exfoliated graphite material. For example, the composite material may exhibit a Thermal Stability Index of at least about 20. In particular, the composite material may exhibit a Thermal Stability Index of at least about 30, such as at least about 35, at least about 40, or even at least about 45. Such thermal stability in a direct formable polyimide composite material is particularly advantageous.

EXAMPLES

Comparative Example 1

General Synthetic Procedure for Preparation of PMDA (pyromellitic dianhydride)/ODA (4,4'-oxy-dianiline) Polyimide Composite with 1% of $Sb_2O_3$ A polyimide sample was prepared from PMDA/ODA and 1.0 wt % $Sb_2O_3$ in accordance with the published procedure of Example 1 of US Patent Publication No. 2007/0154717 (incorporated herein by reference in its entirety).

Comparative Example 2

Synthesis of PMDA/ODA Polyimide Composite with 40 wt % Non-Exfoliated Graphite The procedure similar to Comparative Example 1 is used with the exception that 40 wt % of GP44R graphite, available from Graphtech, Inc. of Cleveland, Ohio, is added to a flask together with the ODA and 1.0 wt % $Sb_2O_3$.

Comparative Example 3

Synthesis of PMDA/ODA Polyimide Composite with 15 wt % Non-Exfoliated Graphite The procedure similar to Comparative Example 1 is used with the exception that 15 wt % of GP44R graphite, available from Graphtech, Inc. of Cleveland, Ohio, is added to a flask together with the ODA and 1.0 wt % $Sb_2O_3$.

Example 1

Synthesis of PMDA/ODA Polyimide Composite with 40 wt % Exfoliated Graphite

The procedure similar to Comparative Example 1 is used with the exception that 40 wt % of exfoliated graphite TG684, available from Graphtech, Inc. of Cleveland, Ohio, is added to a flask together with the ODA and 1.0 wt % $Sb_2O_3$.

Example 2

Synthesis of PMDA/ODA Polyimide Composite with 15 wt % Exfoliated Graphite

The procedure similar to Comparative Example 1 is used with the exception that 15 wt % of exfoliated graphite TG684, available from Graphtech, Inc. of Cleveland, Ohio, is added to a flask together with the ODA and 1.0 wt % $Sb_2O_3$.

Comparative Example 4

Preparation of BPDA/PPD/MPD Copolymer with PPD/MPD ratio=0.5/0.5

A solution is prepared by dissolving p-phenylenediamine (PPD, 12.9 g, 0.119 mol) and m-phenylenediamine (MPD, 12.9, 0.119 mol) in a mixture of 600 g of N-methyl pyrrolidone (NMP) and 482 g of xylene in a 2-liter reactor equipped with a mechanical stirrer, a thermocouple, a Dean-Stark adapter, and a reflux condenser. The solution is heated to 155° C., and the residual water is removed as a xylene azeotrope using the Dean-Stark adapter. The mixture is cooled to 60° C., and bis-phenyl dianhydride (BPDA, 70.61 g, 0.24 mol) is added via a powder funnel. The BPDA weighing bottle and the powder funnel are washed with 123 g of NMP.

After addition, the reaction mixture warms to about 67° C., and the reaction mixture becomes viscous. The reaction mixture is heated at 75° C. for 2 hrs. Inherent Viscosity (IV) is measured in 0.5 g/dl solution in NMP according to the published procedure of U.S. Pat. No. 5,886,129 and has a value of 0.8 dl/g.

The reaction mixture is slowly heated to 155° C. to effect imidization. Water produced during the imidization reaction is collected as a xylene azeotrope in the Dean-Stark adapter. A fine yellow suspension forms. After 5.6 ml of water is collected, the reaction mixture is cooled to 50° C., and 800 ml of methanol is added.

The reaction mixture is passed through a 35-mesh screen and is filtered using a Buchner funnel. The filtrate wet cake is shaken in a shaker with 2 liters of methanol. The suspension is passed through a 16-mesh screen and is filtered using a Buchner funnel. The filtrate wet cake is shaken in a shaker with 2 liters of methanol. The suspension is passed through a 16-mesh screen and is filtered using a Buchner funnel. The filtrate wet cake is shaken in a shaker with 2 liters of methanol, is passed through a 35-mesh screen, and is filtered using a Buchner funnel. The filter cake is dried on a filter for about 30 min and is ground through a 16-mesh screen. The light yellow powder is dried in vacuum oven at 210° C. for 16 hrs.

Comparative Example 5

BPDA/MPD/PPD Copolymer Composite with 15 wt % Non-Exfoliated Graphite

The procedure similar to Comparative Example 4 is used with the exception that 15 wt % of KS-6 graphite, available from Graphtech, Inc. of Cleveland, Ohio, is added to the flask together with the PPD and the MPD.

Example 3

BPDA/MPD/PPD Copolymer Composite with 15% Exfoliated Graphite

The procedure similar to the Comparative Example 4 is used with the exception that 15 wt % of exfoliated graphite TG684, available from Graphtech, Inc. of Cleveland, Ohio, is added to a flask together with the PPD and the MPD.

Comparative Example 6

Preparation of BPDA/PPD/ODA Polyimide with PPD/ODA Ratio=0.8/02

A solution is prepared by dissolving PPD (27.2 g, 0.254 mol) and ODA (12.74, 0.064 mol) in a mixture of 500 g of N-methylpyrrolidone (NMP) and 316.23 g of xylene in a 2-liter reactor equipped with a mechanical stirrer, a thermocouple, a Dean-Stark adapter and a reflux condenser. The solution is heated to 145° C., and the residual water is removed as a xylene azeotrope using the Dean-Stark adapter. The mixture is cooled to 50° C., and bis-phenyl dianhydride (BPDA, 94.14 g, 0.32 mol) is added using a powder funnel. The BPDA weighing bottle and the powder funnel are washed with 142.05 g of NMP.

After addition, the reaction mixture warms to about 75° C., and the reaction mixture becomes viscous. After the exotherm subsides, the reaction mixture is held at 60° C. for 16 hrs. Inherent Viscosity (IV) is measured in 0.5 g/dl solution in NMP according to the published procedure of U.S. Pat. No. 5,886,129 and has a value of 1.692 dl/g.

The reaction mixture is slowly heated to 145° C. to effect imidization. The water produced during imidization reaction is collected as a xylene azeotrope in the Dean-Stark adapter. A fine yellow suspension forms. After 10 ml of water is collected, the reaction mixture is cooled to 50° C. and 800 ml of methanol is added.

The reaction mixture is passed through a 35-mesh screen and is filtered using a Buchner funnel. The filtrate wet cake is mixed in a blender with 300 ml of acetone. The suspension is passed through a 35-mesh screen and is filtered using a Buchner funnel. The filtrate wet cake is stirred with 300 ml of methanol using a blender and is filtered using a Buchner funnel. The filtrate wet cake is stirred with 300 ml of acetone in a blender and is filtered using a Buchner funnel. The filter cake is dried on a filter for about 30 min and is ground through a 16-mesh screen. The light yellow powder is dried in vacuum oven at 210° C. for 16 hrs.

Comparative Example 7

Preparation of BPDA/PPD/ODA Polyimide Composite with 15 wt % Non-Exfoliated Graphite The procedure similar to Comparative Example 6 is used with the exception that 15 wt % of KS-6 graphite, available from Graphtech, Inc. of Cleveland, Ohio, is added to a flask together with the PPD and the ODA.

Example 4

Preparation of BPDA/PPD/ODA Polyimide Composite with 15 wt % Exfoliated Graphite The procedure similar to Comparative Example 6 is used with the exception that 15 wt % of exfoliated graphite TG684, available from Graphtech, Inc. of Cleveland, Ohio, is added to the flask together with the PPD and the ODA.

Example 5

Comparative Testing of the Above Samples

Resins of the Examples and the Comparative Examples are tested according to ASTM procedure D-638. The tensile bars are direct formed at 75,000 psi and are sintered for 4 hrs at 413° C. The tensile bars are subjected to tensile and thermal oxidative stability (TOS) test.

The TOS test is carried out by first weighing the tensile bars at room temperature, then exposing the tensile bars or part of tensile bar to a temperature of 371° C. at 60 psi of air pressure for 100 hrs. The tensile bars or parts of tensile bars are weighed again and TOS Weight Loss is calculated. Further, the Thermal Stability Index may be determined as described above. See Table 1.

TABLE 1

Thermal oxidative stability of polyimide composites

| Material | TOS (%) | Thermal Stability Index |
|---|---|---|
| Comparative Example 1 | 6.1 | 0.0 |
| Example 1 | 3.2 | 47.5 |
| Example 2 | 4.7 | 22.9 |
| Comparative Example 2 | 8.9 | −45.9 |
| Comparative Example 3 | 7.8 | −27.9 |
| Comparative Example 4 | 2.2 | 0.0 |
| Example 3 | 1.1 | 50.0 |
| Comparative Example 5 | 3.3 | −50.0 |
| Comparative Example 6 | 1.7 | 0.0 |
| Comparative Example 7 | 2.5 | −47.1 |
| Example 4 | 1.3 | 23.5 |

As illustrated in Table 1, the composites of exfoliated graphite with polyimide exhibit improved thermal oxidative stability relative to unfilled polyimide and relative to polyimide composites that include non-exfoliated graphite. For PMDA/ODA backbone polyimide materials, the TOS Weight Loss of materials of Examples 1 and 2 is lower than the TOS Weight Loss of materials of Comparative Examples 1, 2 and 3. Further, Comparative Examples 2 and 3 exhibit a negative TOS Index, while Examples 1 and 2 have a significantly positive TOS Index. For BPDA/ODA backbone polyimide materials, the TOS Weight Loss of the material of Example 3 is lower than the TOS Weight Loss of the materials of Comparative Examples 4 and 5. Here too, Comparative Example 5 has a negative TOS Index, while Example 3 has a positive TOS Index. Comparative Examples 6 and 7 and Example 4 exhibit similar trends.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A composite material comprising:

a polyimide matrix material;

0.1 wt % to 5.0 wt % of a metal oxide dispersed in the polyimide matrix material, the metal oxide including an element selected from the group consisting of antimony, boron, phosphorous, and any combination thereof; and an exfoliated graphite material dispersed within the polyimide matrix material;

wherein the composite material exhibits a Thermal Stability Index of at least about 20; wherein the composite material has a particle distribution in which 90% of the particles have a particle size not greater than 500 micrometers.

2. The composite material of claim 1, wherein the Thermal Stability Index is at least about 30.

3. The composite material of claim 1, wherein the exfoliated graphite material is included in a range of about 5 wt % to about 75 wt %.

4. The composite material of claim 1, wherein the polyimide matrix material is a hot compression moldable polyimide powder.

5. The composite material of claim 1, wherein the polyimide matrix material is a direct formable polyimide powder.

6. The composite material of claim 1, wherein the polyimide matrix material is formed from PMDA and ODA.

7. The composite material of claim 1, wherein the polyimide matrix material is formed from BPDA and at least two diamines.

8. The composite material of claim 7, wherein the at least two diamines include ODA and PPD.

9. The composite material of claim 7, wherein the at least two diamines include MPD and PPD.

10. The composite material of claim 1, further comprising a metal oxide.

11. The composite material of claim 1, wherein the exfoliated graphite material includes untreated exfoliated graphite.

12. The composite material of claim 1, wherein the exfoliated graphite material includes treated exfoliated graphite.

13. The composite material of claim 12, wherein the treated exfoliated graphite material includes oxidized exfoliated graphite material.

14. A composite material comprising:

a polyimide matrix material 0.1 wt % to 5.0 wt % of a metal oxide dispersed in the polyimide matrix material, the metal oxide including an element selected from the group consisting of antimony, boron, phosphorous, and any combination thereof; and 5 wt % to 75 wt % of an exfoliated graphite material dispersed in the polyimide matrix material;

wherein the composite material exhibits a Thermal Stability Index of at least 20;

wherein the composite material is a direct formable powder having a particle distribution in which 90% of the particles have a particle size not greater than 500 micrometers.

15. A method of forming a composite powder, the method comprising:

providing exfoliated graphite material and polyamic acid in a solution including at least two solvents;

dispersing a metal oxide particulate in the solution; and imidizing the polyamic acid to form a polymeric material comprising a polyimide material matrix including the exfoliated graphite material dispersed therein, the polymeric material exhibiting a Thermal Stability Index of at least 20.

16. The method of claim 15, wherein imidizing includes heating the solution to at least about 100° C.

17. The method of claim 15, further comprising washing the polymeric material with a washing solvent.

18. The method of claim 15, further comprising drying the polymeric material.

19. The method of claim 15, wherein the at least two solvents include a high polarity solvent and a low polarity solvent.

20. The method of claim 19, wherein a ratio of the amount of the high polarity solvent to the low polarity solvent in the solution is between 3.5:1 and 4:1.

21. The method of claim 19, wherein the high polarity solvent is selected from the group consisting of N-methylpyrrolidone (NMP), N,N'-dimethylformamide (DMF), and N,N'-dimethylacetamide (DMAC).

22. The method of claim 19, wherein the low polarity solvent is selected from the group consisting of toluene, xylene, ethyl acetate, and t-butyl methyl ether.

23. The method of claim 15, wherein providing the exfoliated graphite powder and the polyamic acid in the solution including the at least two solvents comprises:

dispersing an exfoliated graphite material in a solution comprising a diamine; and adding a dianhydride to the solution comprising the diamine and the exfoliated graphite material, resulting in the polyamic acid.

24. The composite material of claim 1, wherein the Thermal Stability Index is at least 40.

25. The composite material of claim 24, wherein the Thermal Stability Index is at least 45.

26. The composite material of claim 1, wherein the polyimide matrix is the reactive product of biphenyltetracarboxylic acid dianhydride (BPDA) and diamines m-phenylene diamine (MPD) and p-phenylene diamine (PPD), and wherein the Thermal Stability Index is at least 45.

* * * * *